United States Patent Office 2,821,456
Patented Jan. 28, 1958

2,821,456

METHOD OF INCREASING THE FILLING POWER, ETC., OF LANDFOWL FEATHERS WITH MAGNESIUM SILICOFLUORIDE AND PRODUCTS PRODUCED THEREBY

Edward R. Frederick, Pittsburgh, Pa., assignor to the United States of America as represented by the Secretary of the Army No Drawing. Application February 16, 1956
Serial No. 566,053

4 Claims. (Cl. 8—94.10)

This invention relates to methods of treating feathers, especially chicken and other land fowl feathers, but excluding waterfowl feathers and down.

This application is a continuation-in-part of my pending application Ser. No. 287,427 filed May, 12, 1952, now abandoned.

The conventional waterfowl down and feather mixture used as a filler for sleeping bags is generally satisfactory, but is much too expensive and is not available in this country in sufficient quantity to satisfy both military and civilian demands. Therefore research has turned to chicken feathers (which chemically are similar to duck and goose feathers) as probably the least expensive and most readily available raw product capable of being processed to become a satisfactory filler. Some of the results of this research are disclosed in my Patent No. 2,715,086 which issued Aug. 9, 1955; as there stated, the filling power of crushed chicken feathers has been increased more than 100% by dry cleaning followed by coating with a wax, a resin or an elastomer, and finally drying with agitation to fluff them.

In explanation of the term "filling power," reference may be made to the report entitled, "A Proposed Method for Measuring the Filling Power of Down and Feathers," by Henry A. Sinski, publication No. TD 103037, The Office of Technical Services, U. S. Department of Commerce, and to the article by N. B. Edelman in Textile Research Journal, vol. 17, p. 199 (1947) entitled, "Investigation of Methods for Determining the Filling Power of Feathers." See also the Sinski et al. Patent No. 2,706,910, April 26, 1955.

Waterfowl downs have a unique form comprising very stiff fibers radiating from a central low density core; these fibers are apparently four to ten times stiffer than chicken feather barbs; this stiffness partially accounts for the high filling power of such downs. Chicken feathers are straight vaned with their barbs and barbules invariably oriented in one plane. Waterfowl downs owe about 25% of their filling power to a very marked electrostatic charge, seemingly due to the extremely effective water repellent natural finish protecting the fibers. Straight (i. e. untreated) chicken feathers have a natural finish which does not repel water, which reduces filling power as much as 40% and inhibits the addition of wax, resins or elastomers. Straight feathers develop an electrostatic charge, apparently of the di-pole type, while commercial crushed chicken feathers possess little or no tendency to develop an electrostatic charge. Waterfowl feathers have greater filling power under high humidity conditions than when dry, due to a higher curl which seems to arise because of moisture plasticization and internal stresses, but chicken feathers show no tendency to curl in the presence of moisture.

The principal object of this invention is to provide a simple process for treating chicken feathers, including soiled and clean whole feathers and commercial crushed feathers (so-called "curled" feathers) so as greatly to increase the filling power, and so as to cleanse, preserve, mothproof and stiffen the feathers and impart water repellent properties thereto. Other objects will be apparent from the following description of the preferred method.

With dry cleaning

This aspect of the invention starts with commercial crushed chicken feathers which have been dry cleaned twice with perchloroethylene (tetrachloroethylene), leaving a residual wax content of about 0.42% by weight. 300 gm. of feathers is stirred into 10,000 cc. of a 1% (by weight) aqueous solution of magnesium silicofluoride ($MgSiF_6$) at 55–60° C., and the stirring is continued for about two hours by means of a mechanical stirrer. The $MgSiF_6$ content of the solution may range between 0.75% and 1.7% by weight; or based on the feather load, such content may range from a few percent up to slightly over 30%. The pH of the solution ranges between 2 and 3, due to hydrolysis of the silicofluoride. Then the feathers are drained of the solution, are washed one or more times with water to remove surplus magnesium silicofluoride, and are again drained. Finally the treated feathers are dried and fluffed in a closed chamber by being circulated in heated air. One form of apparatus satisfactory for this purpose is disclosed in the Frederick, Jaskowski and Haller Patent No. 2,739,391 dated March 27, 1956.

Without dry cleaning 300 gm. of crushed chicken feathers which have not been dry cleaned (and hence may be assumed to hold an appreciable quantity of dirt, also some coagulated blood, as well as all the natural oils and waxes) is stirred into 10,000 cc. of a 1% (by weight) aqueous solution of magnesium silicofluoride at preferably 55–60° C., and the stirring is continued as before. However, the temperature may go as high as 100° C. and the silicofluoride content may range between 0.75% and 1.7%, as stated above. Then the feathers are drained of the solution and are washed several times with water to remove surplus magnesium silicofluoride and dirt, and are again drained. Finally the treated feathers are dried in a closed chamber as above described, which results in fluffing and electrostatically charging the feathers.

Filling power tests

| | F. P. Prior to Fluffing | F. P. After Fluffing |
|---|---|---|
| Crushed Chicken Feathers + $MgSiF_6$ | 2.74 | 5.4 |
| Crushed chicken feathers, twice dry cleaned + $MgSiF_6$ | 2.74 | 4.0 |

NOTE.—The above results were obtained at the Mellon Institute of Industrial Research using a slightly modified Sinski apparatus. The filling power of the 40–60 waterfowl down-feather mixture now being purchased by the U. S. Army for use in sleeping bags varies between 5.5 and 5.8. The filling power of natural washed but unprocessed chicken feathers is about 1.9.

The action of the magnesium silicofluoride on the chicken feathers is presumed to bring about several changes of significant importance. The presence of the Mg ion at the acidity (pH 2–3) of the solution may produce a tanning action on the feather keratin. The harsh feel of the processed feathers is considered to be brought about through the deposition of $SiO_2$ resulting from hydrolysis of the magnesium silicofluoride and subsequent decomposition at elevated temperatures.

It is to be particularly noted that with the magnesium silicofluoride treatment, the unclean feathers have a 35% greater filling power than the twice dry cleaned feathers. No reason is known for this surprising fact, but it is believed that the unclean feathers have an oil or fat (removable by dry cleaning) which is chemically changed by the magnesium silicofluoride into an insoluble soap, and this soap forms a water repellent film which increases the ability of the feathers to accept a static charge. It is certain that the treated soiled feathers after fluffing have a materially greater static charge, also considerably greater water repellency, than the treated dry cleaned feathers after fluffing.

The term "feathers" as used herein includes clean and unclean whole landfowl feathers, crushed ("curled") feathers, landfowl feather fibers, and stripped landfowl feathers, i. e., barbs stripped from their quills to produce strips of barbs attached to thin films peeled from the quills, but not waterfowl feathers or down.

For some unknown reason, potassium and sodium and some other silicofluorides do not give the same results as magnesium silicofluoride, therefore I claim only treatment with the latter salt.

What I claim is:

1. A method of treating soiled landfowl feathers to enhance their filling power and make them an acceptable substitute for waterfowl feathers which comprises immersing the soiled landfowl feathers in a solution consisting of magnesium silicofluoride in water at a concentration of 0.75% to 1.7% by weight, with the pH ranging from 2 to 3, the solution being heated in the range of 55° C. to 100° C.; stirring the mixture; continuing the immersion until the filling power of the feathers is increased and the feathers become cleansed, preserved, mothproofed, stiffened and water repellent; removing the landfowl feathers and washing them with water to remove uncombined and non-absorbed magnesium silicofluoride, dirt and foreign matter; and drying and fluffing the landfowl feathers.

2. A method of treating landfowl feathers to enhance their filling power and make them an acceptable substitute for waterfowl feathers which consists in washing and dry-cleaning them to remove nearly all their natural oil and wax as well as nearly all dirt and foreign matter carried by them, then immersing the nearly clean landfowl feathers in an aqueous solution consisting of 1% by weight of magnesium silicofluoride in water at a temperature ranging between 55° and 60° C., with the pH between 2 and 3; stirring the mixture for approximately two hours; removing the landfowl feathers and washing them with water to remove the uncombined and non-absorbed magnesium silicofluoride; and drying, fluffing and electrostatically charging the landfowl feathers.

3. The stiffened, mothproofed and water-repellent landfowl feathers of increased filling power produced by the method of claim 1.

4. The stiffened, mothproofed and water-repellent landfowl feathers of increased filling power produced by the method of claim 2.

References Cited in the file of this patent

UNITED STATES PATENTS

| | | |
|---|---|---|
| 2,091,075 | Landers | Aug. 24, 1937 |
| 2,127,252 | Fischer | Aug. 16, 1938 |